(12) United States Patent
Woychik

(10) Patent No.: US 10,279,543 B1
(45) Date of Patent: May 7, 2019

(54) METHOD FOR CONSTRUCTING AVIONICS PANEL USING ADDITIVE LAYER DEPOSITION

(71) Applicant: Gerard A. Woychik, Shellsburg, IA (US)

(72) Inventor: Gerard A. Woychik, Shellsburg, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 303 days.

(21) Appl. No.: 14/850,882

(22) Filed: Sep. 10, 2015

(51) Int. Cl.
*B28B 1/14* (2006.01)
*B29C 67/00* (2017.01)
*B29C 64/124* (2017.01)
*B29K 33/00* (2006.01)
*B29K 705/00* (2006.01)
*B29L 31/30* (2006.01)
*B29C 64/153* (2017.01)
*B29C 64/10* (2017.01)

(52) U.S. Cl.
CPC ........ *B29C 67/0066* (2013.01); *B29C 64/124* (2017.08); *B29C 67/0077* (2013.01); *B29C 67/0088* (2013.01); *B29C 64/10* (2017.08); *B29C 64/153* (2017.08); *B29K 2033/08* (2013.01); *B29K 2705/00* (2013.01); *B29K 2995/0026* (2013.01); *B29L 2031/3079* (2013.01)

(58) Field of Classification Search
CPC ............ B29C 67/0066; B29C 67/0077; B29C 67/0088; B29K 2033/08; B29K 2705/00; B29K 2995/0026; B29L 2031/3079
See application file for complete search history.

(56) References Cited

U.S. PATENT DOCUMENTS

| 2006/0035034 A1* | 2/2006 | Matsumoto | B29C 67/0059 427/487 |
| 2013/0011215 A1* | 1/2013 | Wells | F16B 23/0007 411/402 |
| 2014/0191439 A1* | 7/2014 | Davis | B29C 67/0051 264/259 |

(Continued)

OTHER PUBLICATIONS

Jeff Hanson, Top Five Benefits of Addititve Manufacturing (You Never Considered), Feb. 19, 2013, Manufacturing.net, p. 1-4.*

(Continued)

*Primary Examiner* — William P Bell
*Assistant Examiner* — Andrew L Swanson
(74) *Attorney, Agent, or Firm* — Donna P. Suchy; Daniel M. Barbieri

(57) ABSTRACT

A method of manufacturing a light plate includes defining a three-dimensional model of the light plate. The model includes a translucency map configured to light balance the light plate. The translucency map defines a first portion having a first translucency. The method includes providing the model to an additive layer device; selecting at least one material based on the model; and depositing the at least one material in a layer based on the model. The method includes at least one of adhering the at least two layers of material with one another and cross-linking the at least two layers of material with one another to form a first region of the light plate corresponding to the first portion of the translucency map.

6 Claims, 4 Drawing Sheets

(56) References Cited

U.S. PATENT DOCUMENTS

| | | | | |
|---|---|---|---|---|
| 2014/0268604 A1* | 9/2014 | Wicker | ............... | B29C 70/885 |
| | | | | 361/760 |
| 2014/0277661 A1* | 9/2014 | Amadio | ............. | B29C 67/0088 |
| | | | | 700/97 |
| 2014/0328964 A1* | 11/2014 | Mark | ................ | B29C 67/0088 |
| | | | | 425/166 |
| 2015/0078712 A1* | 3/2015 | Brunner | ........... | B29D 11/00663 |
| | | | | 385/92 |

OTHER PUBLICATIONS

Flightdeck Solutions, IBL Series Panels, Aug. 25, 2011, youtube.com, screenshot only attached.*

Ken Scott, Metal Workshop Setup, Mar. 2003, Kitplanes Magazine, p. 2.*

Symbolic Displays, Inc., Simulator Displays, Aircraft Panels and Avionic Keyboards from SDI, Sep. 25, 2008.*

Westboro Photonics, Light Panel Balancing, http://www.wphotonics.com/solutionLPB.php, imaged captured on the Internet Archive Sep. 22, 2013 (Year: 2013).*

Xiao, Looking against the light: how perception of translucency depends on lighting direction. Journal of Vision, 14(3):17, 1-22, http://www.journalofvision.org/content/14/3/17, doi:10.1167/14.3.17, pp. 1, 3 (Year: 2014).*

* cited by examiner

METHOD FOR CONSTRUCTING AVIONICS PANEL USING ADDITIVE LAYER DEPOSITION

BACKGROUND

The present disclosure relates generally to the field of avionics panels, and more specifically, to additive layer deposition ("3D printing"), including additive layer deposition for building avionics panels, also known as light plates. Additive layer deposition is a manufacturing process in which layers of materials are combined to form a finished product. Computer control may be used to guide successive deposition of layers of material.

Light plates are used in cockpits to provide a control interface. Light plates may include various implements such as knobs, buttons, and switches, with labelling. Light plates may have a transparent or translucent quality such that light passing through the light plate illuminates the implements.

SUMMARY

In one aspect, embodiments of the inventive concepts disclosed herein are directed to a method of manufacturing a light plate. The method includes defining a three-dimensional model of the light plate. The model includes a translucency map configured to light balance the light plate. The translucency map defines a first portion having a first translucency. The method includes providing the model to an additive layer device; selecting at least one material based on the model; and depositing the at least one material in a layer based on the model. The method includes at least one of adhering the at least two layers of material with one another and cross-linking the at least two layers of material with one another to form a first region of the light plate corresponding to the first portion of the translucency map.

In a further aspect, embodiments of the inventive concepts disclosed herein are directed to a method of manufacturing a light plate. The method includes defining a three-dimensional model of the light plate; providing the model to an additive layer device; and performing a deposition process to deposit a plurality of layers to form the light plate. The deposition process includes associating at least one material for each layer, depositing the at least one material for each layer, and light-balancing the light plate.

In a further aspect, embodiments of the inventive concepts disclosed herein are directed to a system for manufacturing a light plate. The system includes an additive layer device. The additive layer device includes a deposition device and a laser device. The system also includes a processing circuit configured to control operation of the deposition device to deposit a plurality of layers of materials based on a three-dimensional model of the light plate, and to control operation of the laser device to perform at least one of adhering and cross-linking the plurality of materials to one another.

DETAILED DESCRIPTION

Figure 1A:
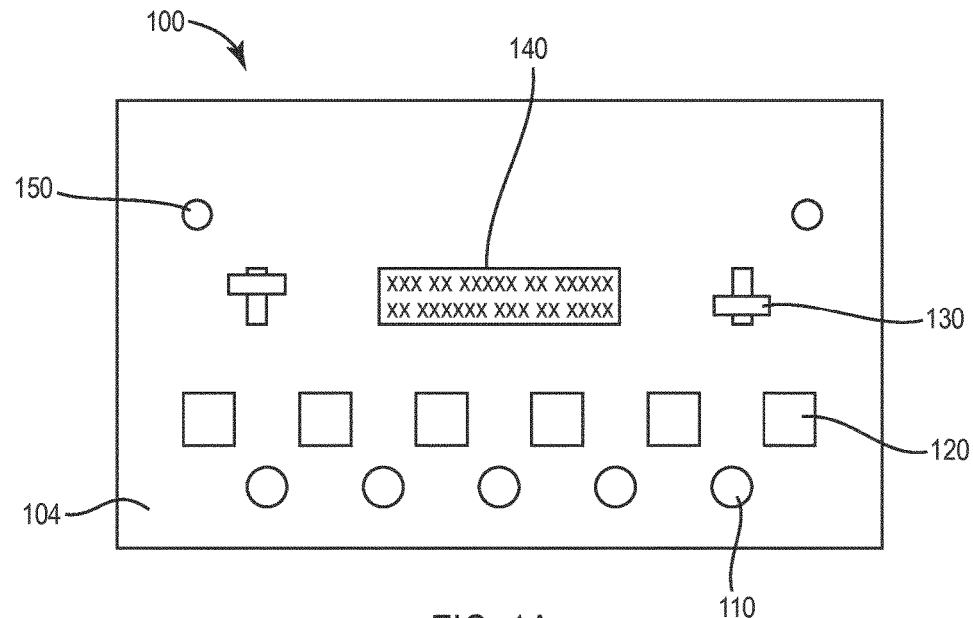
FIG. 1A is a top view of a light plate according to an exemplary embodiment.

Referring to the figures generally, a light plate is manufactured using additive layer deposition. An additive layer device deposits various materials in successive layers in order to form the light plate. The successive layers or portions thereof may be adhered onto one another, or may be cross-linked to one another via laser sintering, or combinations thereof. The additive layer device receives a three-dimensional model of the light plate, and the additive layer device uses the model to guide the deposition of the materials forming the light plate and to determine which layers or portions of layers to adhere, sinter, deposit, and which to cross-link. The light plate can include a body, several push buttons and knobs, and threaded inserts. The light plate can include nomenclature (e.g., labels, icons) that may be associated with specific knobs/buttons/etc. In some embodiments, the light plate has translucent properties for allowing light to pass through and illuminate various aspects of the light plate; the translucent properties are provided by cross-linking various layers via laser sintering in which deposition of material is controlled so as to provide translucency. Translucent properties may also be provided by light channeling through the light plate. In some embodiments, the translucency of the light plate is configured so that light passing through a top surface of the light plate is light-balanced and so that light passing through light channels in the light plate is light-balanced in the perpendicular and axial directions relative to the light channels.

A three-dimensional model is an information-based representation of a structure, such as a light plate. The three-dimensional model is indicative of a plurality of layers or slices forming the overall structure and any internal structures thereof, such as light channels. The plurality of layers may contain in each layer metals and other materials varying in properties such as hardness, flexibility, and particle size (e.g. fine particles vs. coarse particles). The plurality of layers may contain voids of material. The three-dimensional model may be provided as part of a CAD file.

The three-dimensional model may be provided in any format appropriate for manufacturing a light plate using additive layer deposition. The three-dimensional model may include instructions directing an order in which layers of material and/or sections of layers of material are deposited during the manufacturing process. The three-dimensional model may specify the types and positions of materials deposited in each layer and whether each subsequent layer or portion of a layer is adhered to a base material (e.g., a material previously and/or adjacently deposited) or is cross-linked with the base layer (e.g., via laser sintering or other suitable techniques). For example, where a portion of the light plate is desired to be conductive and/or translucent (e.g., transparent), the respective layers or portions thereof may be cross-linked via laser sintering. Further, where a portion of the light plate is desired to be opaque or non-conductive, the respective layers or portions thereof may be adhered onto the base material. A combination of multiple cross-linked, sintered, deposited, and adhered layers may be configured so as to provide an overall light-balanced light plate and/or light channeling through the light plate, and may be stored as a three-dimensional model of the light plate.

In some embodiments, the properties of the materials in each layer determine whether any applied laser will cause the materials to cross-link by sintering, or to adhere. For example, the organization of materials and the fineness/coarseness of the materials may determine whether the materials cross-link or adhere. In some embodiments, relatively fine materials will cross-link, while relatively coarse particles will adhere. Each layer of materials may have the same thickness of materials. A laser used to cross-link or adhere materials may have its operation controlled based on the three-dimensional model.

Cross-linking systems and methods as disclosed herein are used to join materials and/or layers of materials such that the materials are translucent and/or conductive. For example, cross-linked materials may have a coherent/organized crystal lattice. Cross-linking may cause materials to bond to one another on a molecular level (e.g., molecular bonding). Cross-linking may be performed using laser sintering methods, in which a laser (e.g., a carbon dioxide laser) is directed to the materials to be cross-linked and provides the thermal energy for the cross-linking. Laser sintering may cause cross-linking depending on the properties of the materials to be cross-linked. For example, materials may undergo cross-linking as a function of material properties such as size and/or organization of the layers (e.g., thickness, density, size of voids, fineness vs. coarseness) in response to receiving energy from the laser.

In some embodiments, the materials are provided as powders, such as powders of metals. In some embodiments, the materials are provided in a liquid phase, or as a combination of powders and liquid phase materials. In some embodiments, laser sintering forms a coherent/organized crystal lattice by reducing the porosity of the materials due to atomic diffusion of material particles. Further, in some embodiments a laser may be used to solidify and/or adhere liquid-phase material layers onto a base layer.

Adhering systems and methods as disclosed herein are used to join materials and/or layers of materials such that the materials are opaque and/or non-conductive. Adhering methods may be used in which layers of materials include polymers, such as thermoplastics, that adhere to one another. For example, the materials may be configured to adhere to one another at certain temperatures, and depending on material properties (e.g., melting temperature, glass transition temperature).

Figure 1B:
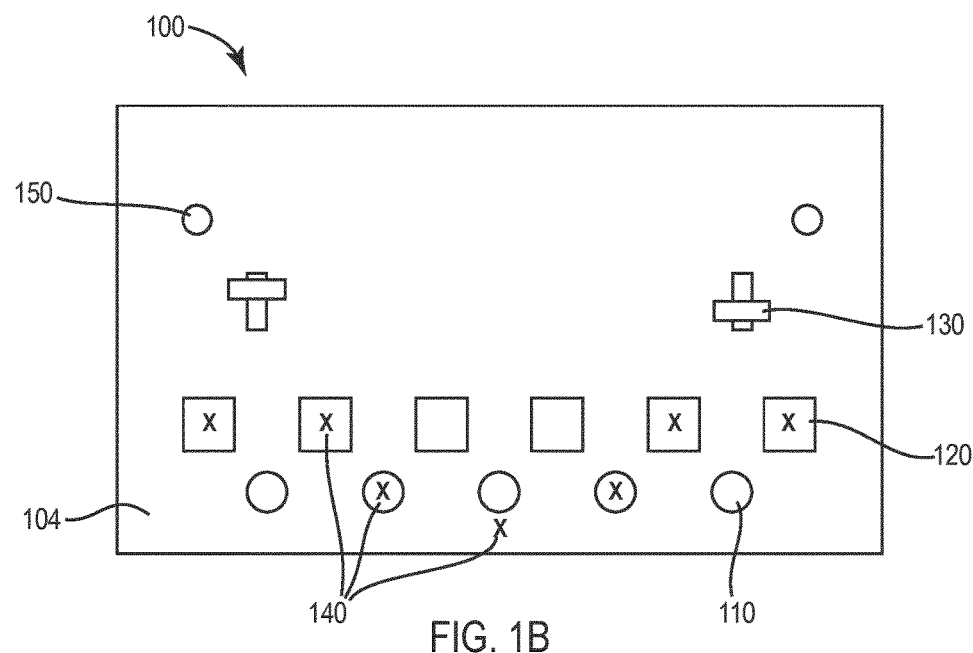
FIG. 1B is a top view of the light plate of FIG. 1A having a varied nomenclature according to an exemplary embodiment.

Referring to FIGS. 1A-1B, a light plate 100 according to an exemplary embodiment is shown. The light plate 100 includes various features for interacting with any systems that the light plate 100 is connected to, such as knobs 110, buttons 120, and switches 130. The light plate 100 may provide controls for, and be connected to, systems such as navigation systems, communication systems, avionics systems, radar systems, on-board environmental systems. The light plate 100 includes nomenclature 140 detailing information regarding the light plate 100. The nomenclature 140 may be disposed on a top surface 104 of the light plate 100. The top surface 104 may include a layer or layers of the same material generally used through the light plate 100, or may include one or more layers of a different material.

The top surface 104 may include a visualization layer. For example, the top surface 104 may include a layer of paint or other material designed having a different color or appearance compared to the surrounding material to draw attention to specific regions of the top surface 104 and/or the light plate 100. The visualization layer may be integrated with the nomenclature 140 to help display information provided by the nomenclature 140. The visualization layer may include paint or other material for specific conditions, such as anti-reflective material, fluorescent material, etc. The visualization layer may be formed by additive layer deposition of letters, symbols, or nomenclature that may include one or more visually-distinct layers, such as layers having a different color, texture, visual, or tactile appearance, as compared with the surrounding material. The layers forming the visualization layer may be adhered onto base material in some embodiments. In some embodiments, the nomenclature 140 is formed with materials (e.g., acrylic) used for other components of the light plate 100 such as the top surface 104, and the visualization layer may be deposited using visually-distinct material on top of the nomenclature 140. The nomenclature 140 may be disposed at an end of a light channel (see, e.g., light channel 105 shown in FIG. 5). The color/and or brightness of the nomenclature 140 may be determined based on the light channel 105, including properties of the materials used to provide the light channel 105.

The nomenclature 140 may be made clearly visible by using the three-dimensional translucency map for controlling the translucency of light passing through the light plate 100 and/or through the layers of the light plate 100 underlying and/or forming the nomenclature 140. While FIG. 1A shows the nomenclature 140 disposed separate from other components such as the knobs 110, or the buttons 120, as shown in FIG. 1B, the nomenclature 140 may also be disposed on or about other components such as the knobs 110 or the buttons 120.

In some embodiments, the additive layer deposition methods disclosed herein improve the creation of the nomenclature 140 and the visualization layer. The visualization layer may be deposited with uniform thickness on all surfaces of the nomenclature 140, including corners and edges that would otherwise receive little or no visualization layer material in a typical light plate manufacturing operation. As such, the visualization layer has increased resistance to wear by friction, such as from being handled by a user. In some embodiments, the visualization layer is between 1 and 10 microns in thickness. In some embodiments, the visualization layer is 5 microns in thickness. The thickness of the visualization layer may be selected to determine the intensity or other visual impact of the visualization layer, while also maximizing resistance to wear and minimizing material costs. Further, in some embodiments, the translucency of the material underlying and/or forming the nomenclature 140 may be specified in the three-dimensional map of the light plate 100 so as to provide the nomenclature with a desired visual appearance when light is shined through the light plate 100 and/or the nomenclature 140.

The light plate 100 may be edge-lit or back-lit. For example, the light plate 100 may include a series of lights (e.g., LED lights) disposed along edges of the light plate 100. Lights may be disposed separately from the light plate 100, such as in the form of a back light above which the light plate 100 is positioned. Light may travel through the light plate 100 via one or more light channel regions defined in the translucency map and formed in the light plate 100 as light channels 105 as described herein.

A three-dimensional translucency map may be used to beneficially control the translucency of light travelling from the lights through the light plate 100 for illuminating the light plate 100 and the nomenclature 140. One or more light channel regions corresponding to light channel(s) 105 may be specified in the translucency map. Further, the translucency properties of material applied in the layers may be controlled in order to provide translucency such as via a three-dimensional translucency map for the light plate 100. For example, the density and/or coarseness of material applied may be controlled, such that material is applied more densely/coarsely in regions requiring relatively low translucency, and material is applied less densely/coarsely in regions requiring relatively high translucency. Materials may be selected (e.g., a three-dimensional map or model of the light plate 100 may denote which materials are to be applied in certain positions) based on intrinsic translucency/optic properties, such that relatively translucent material may be applied in regions requiring relatively high translucency, and relatively opaque (i.e., low translucency) material may be applied in regions requiring relatively low translucency. Further, layers of material or portions of layers of material may be cross-linked with one another in areas requiring relatively high translucency, and layers of material or portions of layers of material may be adhered with one another in areas requiring relatively low translucency. In some embodiments, material for the light plate 100 is chosen so that the light plate 100 has very high translucency (e.g. nearly transparent or fully transparent).

The light plate 100 may include a variety of components, such as knobs 110 and buttons 120. In some embodiments, the light plate 100 includes 4-5 knobs 110 and 6 buttons 120. In some embodiments, the light plate 100 includes at least one knob 110. In some embodiments, the light plate 100 includes at least one button 120. In some embodiments, the light plate 100 has a length dimension of approximately 4-5 inches, and a width dimension of approximately 3-5 inches. While FIGS. 1A-1B shows the light plate 100 as having 5 knobs 110, 6 buttons 120, and two switches 130, any number of such components may be used depending on the specifications required for the light plate 100.

The knobs 110, buttons 120, and switches 130 may be inserted into the light plate 100. In some embodiments, the knobs 110, buttons 120, and/or switches 130 are manufactured in a separate additive layer deposition process (e.g., a process using laser sintering) from the manufacturing of the light plate 100. The knobs 110, buttons 120, and/or switches 130 may be configured to correspond to characteristics of openings or other engagement members provided in the light plate 100 for receiving the knobs 110, buttons 120, and/or switches 130. For example, the knobs 110 may include an opening configured to engage an engagement member (not shown) provided with the light plate 100. The engagement member may be configured to deform threads provided in the opening of the knobs 110 in order to engage (e.g., lock) the engagement member to the knobs 110.

As shown in FIGS. 1A-1B, the light plate 100 is in a later stage of construction with the nomenclature 140 being provided. The nomenclature 140 may include labels, icons, symbols, and any other visual indicators of information. The nomenclature 140 may require high precision deposition in order to provide clear, easily visible indicators with well-defined edges. For example, an additive layer device (e.g., additive layer device 300 shown in FIG. 6) may be configured to deposit layers or portions of layers of material within specific tolerances (e.g., less than one quarter inch, less than one eighth inch), which layers or portions of layers may be adhered onto one another. One or more light channels 105 may be formed in the light plate 100 so as to provide illumination to the nomenclature 140 and/or light-balance the nomenclature 140 and the light plate 100. The nomenclature 140 may be provided in combination with a visualization layer in order to highlight certain features of the light plate 100, the nomenclature 140, etc. In some embodiments, the visualization layer may be omitted, and the nomenclature 140 may have a predetermined translucency achieved by an appropriate combination of materials, adhered layers (or portions of layers), and cross-linked layers (or portions of layers), which combination may be specified in a three-dimensional translucency map for the light plate 100 and may be configured so as to provide any desired visual appearance to the nomenclature 140.

In some embodiments, the nomenclature 140 is coordinated with a visualization layer and with lighting in order to highlight certain features of the light plate 100 based on ambient conditions. For example, the light plate 100 may operate in a "day mode" in which any lighting (e.g., edge lighting passing through the light plate 100) is held to a minimum intensity, and avionics features particular to daytime operation of an aircraft are highlighted. Similarly, the light plate 100 may operate in a "night mode" in which any lighting (e.g., edge lighting passing through the light plate 100) is held to a normal or greater than normal mode, and avionics features particular to nighttime operation of an aircraft are highlighted. For example, a visualization layer may include fluorescent material or other material easily visible at night, or certain lights may be turned on and light may be directed through translucent regions in order to illuminate certain nomenclature or other features (e.g. the buttons 120). A mode of operation of the light plate 100, and/or an intensity of light passing through the light plate 100, may be controlled manually using components such as the knobs 110, or the buttons 120; such lighting features may also be controlled automatically, such as by using a sensor to detect ambient light intensity levels in a cockpit; and/or by associating lighting features with a time of day.

Figure 2:
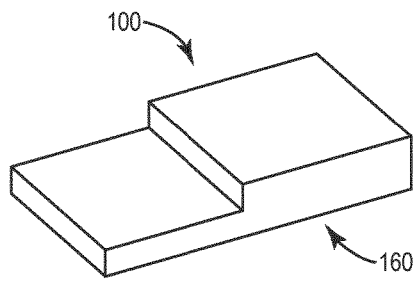
FIG. 2 is a perspective view of an intermediate stage of the construction of a light plate according to an exemplary embodiment.

Referring to FIG. 2, the light plate 100 is shown during an early stage of construction by additive layer deposition, according to an exemplary embodiment. A body 160 of the light plate 100 provides a base structure on which further layers, structures, and/or components of the light plate 100 may be deposited. FIG. 2 shows a relatively significant step between a first side and a second side of the body 160, such as by depositing several successive layers that do not cover the full surface area of lower layers. Other relationships between successive layers of the light plate 100 may also be established during and after the manufacturing process. For example, the surface area covered by any given layer may include any fraction of the full surface area of a preceding layer, up to and including the full surface area of the preceding layer. In some embodiments, a layer may be deposited in a pattern to allow for selective gaps between layers and/or sections of layers. In some embodiments, layers may be deposited so as to form one or more light channels 105 allowing light to travel through the light plate 100. The three-dimensional model of the light plate 100 may be used for direct deposition of layers in various such patterns. The body 160 may be constructed from a variety of materials including metals or thermoset plastics. In some embodiments, the body 160 is constructed using acrylic. In some embodiments, the body 160 is constructed using clear acrylic or translucent acrylic. In some embodiments, at least a portion of the body 160 is constructed using layers of material (e.g., acrylic) that are adhered to one another. By adhering the layers of material to one another, the layers are provided with a relatively low translucency (e.g., the layers are opaque). In some embodiments, at least a portion of the body 160 is constructed using layers of material (e.g., acrylic or metal powders) that are cross-linked to one another. By cross-linking the layers of material to one another, the layers have a relatively high translucency, allowing light to pass through the layers. Cross-linking the layers may cause the crystal lattice of the layers to be aligned. In a preferred embodiment, a first portion (e.g., region) of the body 160 includes layers that are adhered to one another, a second portion (e.g., region) of the body 160 includes layers that are cross-linked to one another, and a third portion may include a light channel 105. By selecting certain portions to be adhered and certain portions to be cross-linked, the translucency of the light plate 100 may be controlled, and thus the light plate 100 may be light-balanced. Further, by selecting locations, termination points, radial transparency, or axial transparency of light channels 105, the light plate 100 may be light balanced.

Figure 3:
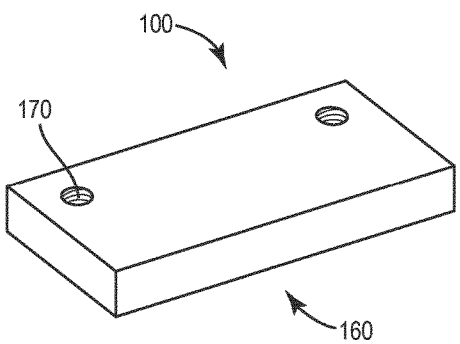
FIG. 3 is a perspective view of a light plate having threaded inserts according to an exemplary embodiment.

Referring to FIG. 3, the light plate 100 is shown during an intermediate stage of construction by additive layer deposition, according to an exemplary embodiment. Openings 170 may be provided in light plate 100 by selectively depositing material to form layers of the light plate 100. The three-dimensional model of the light plate 100 may include specifications regarding the size of the openings 170, such as depth, width/radius, shape, etc. While FIG. 3 shows the openings 170 as having a cylindrical form, any suitable form for the openings 170 may be used. The openings 170 may pass entirely through the light plate 100, or may have a depth less than a height of the light plate 100.

In some embodiments, the light plate 100 includes a planar insert 195 configured to reduce or eliminate electromagnetic interference. The planar insert 195 may be formed from metal(s). In some embodiments, the planar insert 195 is continuous (e.g., no gaps, through-holes, or other such openings are provided in the planar insert 195). In some embodiments, the planar insert 195 extends to all sides of the light plate 100. In some embodiments, the planar insert 195 includes openings, such as portions of the openings 170. By manufacturing the light plate 100 and the planar insert 195 using additive layer deposition, the portions of the openings 170 in the planar insert 195 may be provided with significant precision, minimizing the surface area required for the openings 170 and thus minimizing any electromagnetic interference. While FIG. 3 shows the planar insert 195 disposed within an inner region of the body 160 of the light plate 100, in various embodiments, the planar insert 195 may be disposed at various locations of the light plate 100, such as on a bottom surface of the light plate 100 (e.g., on a surface of the light plate 100 opposite the top surface 104, opposite where the nomenclature 140 and visualization layer are disposed).

Figure 4:
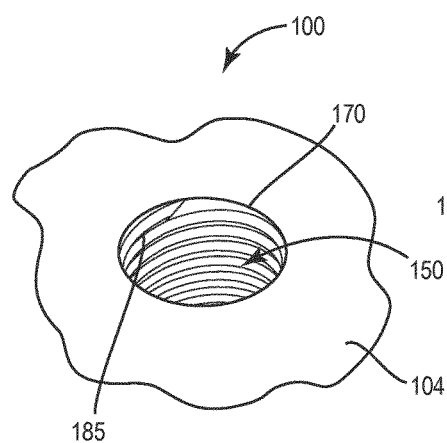
FIG. 4 is a partial view of a top face of a light plate in the vicinity of a threaded insert according to an exemplary embodiment.

Referring to FIG. 4, threaded inserts 150 for the light plate 100 are shown according to an exemplary embodiment. The threaded inserts 150 may be provided for fastening the light plate 100 to other components using fasteners (e.g., threaded fasteners). The threaded inserts 150 may include a variety of thread formations. The threaded inserts 150 may allow for the light plate 100 to be reversibly coupled to other structures, such as structures within a cockpit, etc. The threaded inserts 150 may be formed simultaneously with layers of material at the same height. For example, a deposition device (shown in FIG. 6) may be configured to apply material at an angle deviating from an angle normal to a deposition surface of an additive layer device (see, e.g., additive layer device 300 having deposition surface 310 shown in FIG. 6). The material may thus form a threading 185 adhering to the opening 170 defining the threaded insert 150 without requiring support from a sublayer. In some embodiments, the threaded inserts 150 include metal. In some embodiments, the threaded inserts 150 include plastic.

Figure 5:
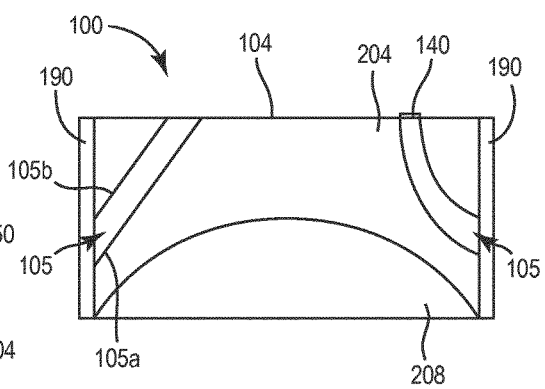
FIG. 5 is a schematic sectional diagram of a translucency map of a light plate according to an exemplary embodiment.

Referring to FIG. 5, a schematic of the light plate 100 is shown based on a translucency map, according to an exemplary embodiment. The light plate 100 may be configured based on the translucency map in order to provide uniform or non-uniform illumination from the light plate 100. The translucency map may be provided as part of a three-dimensional model used to define the structure of the light plate 100. The translucency map may direct production of the light plate 100 such that certain regions of the light plate 100 (e.g., regions with nomenclature 140) and/or light channels 105 have more light pass through than other regions. As shown in FIG. 5, a relatively translucent region 204 allows light to pass through to the top surface 104, while a relatively opaque region 208 inhibits light from passing through to other surfaces of the light plate 100. The light plate 100 may include material such as reflective material deposited along interfaces between various regions, such as the relatively translucent region 204 and the relatively opaque region 208, in order to preferentially redirect light to desired locations on surfaces of the light plate 100 such as the top surface 104.

In some embodiments, the translucency map includes a first portion having a first translucency, and a second portion having a second translucency. The light plate 100 may then be constructed so that the relatively translucent region 204 corresponds to the first portion having the first translucency, and the relatively opaque region 208 corresponds to the second portion having the second translucency. The relatively translucent region 204 may be constructed by cross-linking layers of material to one another, and the relatively opaque region 208 may be constructed by adhering layers of material to one another.

While FIG. 5 illustrates the light plate 100 as having two regions with different translucency, any number of regions may be defined in the light plate 100 based on varying translucency. Additionally, regions such as the relatively translucent region 204 may be uniform (or relatively uniform) in translucency, but include materials such that the relatively translucent region 204 varies in other properties (e.g., density, tensile strength).

In some embodiments, the light plate 100 includes light channels 105. The light channels 105 allow for selection control and direction of light passing through the light plate 100, including through an interior of the light plate 100. The light channels 105 may be wound or otherwise positioned so as to go around the knobs 110, and/or the buttons 120, and some of the light channels 105 may terminate at, or otherwise illuminate, portions of the nomenclature 140. The light channels 105 may be hollow, may include reflective coatings, or may be partially or completely filled with light-diffusing and/or reflective materials, so as to light-balance the light plate 100. For example, the light channels 105 may be defined by a light channel rim having an outer rim surface 105a and an inner rim surface 105b, each of which may include reflective and/or translucent/light-diffusing materials as needed. Light passing through the light channels 105 may exit the light channels 105 axially or radially so as to light-balance the light plate 100. The light channels 105 may have any desired size, shape, or cross-section, and may include multiple sub-channels formed in each light channel 105. In some embodiments, the light channels 105 may connect various regions of the light plate 105. For example, the light channels 105 may be configured to directly channel light from light sources/and or light-filled regions to the top surface 104, including to nomenclature 140. In some embodiments, the light channels 105 may correspond to light channel regions defined in the translucency map, wherein each light channel region includes light channel edges for adjacent layers, such that when the layers of material are deposited, the light channels 105 are formed. Each light channel edge may be defined with different material properties, allowing for specific and selective control over the cumulative properties of the light channels 105.

As shown in FIG. 5, the light plate 100 includes edge lights 190 for providing the light plate 100 as an edge-lit avionics panel. Alternatively, the light plate 100 may include a back light disposed behind the light plate 100, in order to provide the light plate 100 as a back-lit avionics panel. The translucency map may be configured to direct the paths which light follows through the light plate 100 based on whether the light plate 100 is edge-lit or back-lit.

In some embodiments, the translucency map is configured so that light passing through the light plate 100 is balanced ("light-balanced"). For example, the translucency map may be configured so that the relative intensity of light passing out of the top surface 104 of the light plate 100 is uniform across the top surface 104. The light passing through the light plate 100 may be balanced by using at least one of local translucency variations and reflective material to direct light through the light plate 100 so that it passes through the top surface 104 at a uniform intensity or via one or more light channels 105 formed through or in the light plate 100. For example, in some embodiments, components such as knobs 110 and buttons 120 may be relatively opaque, and relatively translucent regions and/or reflective material or light channels 105 may be disposed around the knobs 110 and buttons 120 so that light passes by the knobs 110 and the buttons 120 to reach the top surface 104 in a uniform light-balanced manner. In some embodiments, the light plate 100 is light-balanced when the intensity of light passing out of the top surface 104 is uniform in a direction orthogonal to the top surface 104. In some embodiments, the light plate 100 is balanced such that light passing through the nomenclature 140 is uniform and/or provides the nomenclature 140 with a distinct visual appearance such as brightness and/or color.

Figure 6:
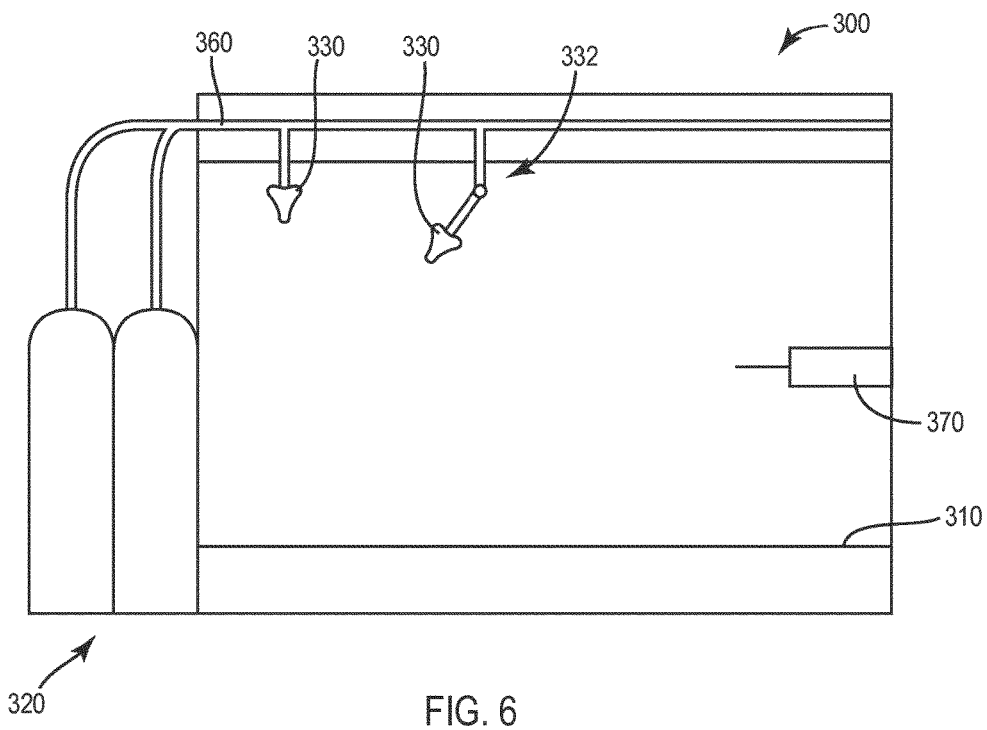
FIG. 6 is a schematic sectional diagram of an additive layer device for manufacturing a light plate according to an exemplary embodiment.

Referring to FIG. 6, an additive layer device 300 for manufacturing a light plate (e.g., light plate 100 shown in FIG. 1) is shown according to an exemplary embodiment. The additive layer device 300 may include a deposition surface 310 upon which layers of material are deposited. The deposition surface 310 may be smooth or rough, uniform or non-uniform; the deposition surface 310 may include grids or other markings to aid in directing deposition of material.

The additive layer device 300 may include storage tanks 320 for storing materials for deposition. Materials may include structural materials (e.g. acrylic, plastics, metals), adhesive materials (e.g., glues), and visualization materials (e.g., dyes, paints, fluorescent materials). In some embodiments, reels may store solid strands of material for use with the additive layer device 300.

The additive layer device 300 may include one or more deposition devices 330. The deposition devices 330 are used to deposit materials in layers. The deposition devices 330 may be permanently connected to specific storage tanks 320, such that a single deposition device 330 always provides a single material stored in a specific storage tank 320. The deposition devices 330 may be attached to position control devices, such as tracks or arms (e.g., arms 332), allowing the deposition devices 330 to move relative to the deposition surface 310 and the light plate 100 while the light plate 100 is being constructed. The additive layer device 300 may also provide angular control for the deposition devices 330, in order to deposit material from the deposition devices 330 at various angles relative to the deposition surface 310 and the light plate 100. The deposition devices 330 may be disposed on arms or other motion implements, allowing the deposition devices 330 to be translated in all three spatial dimensions, and also rotated about each spatial dimension.

In some embodiments, the deposition devices 330 are disposed proximate to the deposition surface 310. The deposition devices may include outlets from which materials flow onto the deposition surface 310 and/or a base layer of the light plate 100 being manufactured in the additive layer device 300. In some embodiments, the deposition devices 330 are configured to overflow the deposition surface 310 and/or a light plate 100 position thereof with a liquid phase material and/or with a powdered material, or combinations thereof. The deposition devices 330 may deposit layers of material adjacent to one another such that adhesive properties of the materials cause the materials to join to one another, or in preparation for adhering the layers of material to one another using a laser device 370.

In some embodiments, a rack, manifold, or other component (e.g., a manifold 360) for distributing a single stream of material to multiple sources is used to deliver materials from the storage tanks 320 to the deposition devices 330. The storage tanks 320 may include liquid phase materials and/or solid phase materials (e.g., solid phase polymers, powdered plastics, powdered metals). The manifold 360 may be modifiable such that different deposition devices 330 are connected to different storage tanks 320 on an ad hoc basis. For example, the three-dimensional model for the light plate 100 may specify varying sets of materials for each layer, and the manifold 360 may be modifiable to provide the varying materials as necessary. In some embodiments, the manifold 360 is made modifiable by coupling a valve system between the storage tanks 320 and the deposition devices 330 in order to control which materials are provided to which of the deposition devices 330.

In some embodiments, the additive layer device 300 includes a laser device 370 for thermosetting, adhering, and/or cross-linking layers of material. The laser device 370 is configured to apply a laser to the layers of material so that the layers of material are solidified, thermoset, adhered, deposited, sintered, or cross-linked with one another. The laser device 370 may be configured to be directed at a constant or predetermined angle, or at various angles, in order to direct a laser throughout the additive layer device 300 and at any angle relative to the deposition surface 310. In some embodiments, the additive layer device 300 uses light data and/or translucency data regarding the light plate 100 to control operation of the laser device 370. The laser device 370 may also be controlled based on the translucency map.

Figure 7:
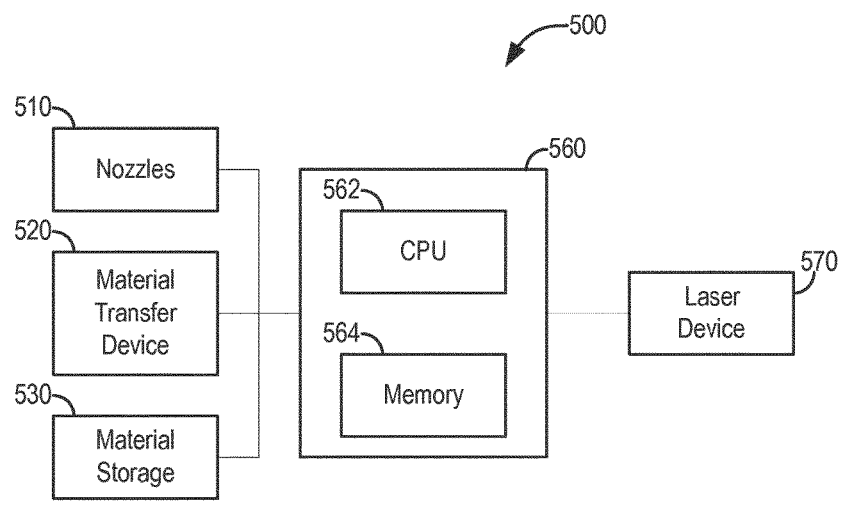
FIG. 7 is a block diagram of a system for manufacturing a light plate according to an exemplary embodiment.

Referring to FIG. 7, a system 500 is shown for manufacturing a light plate (e.g., light plate the 100 shown in FIG. 1) using additive layer deposition. The system 500 is similar to the additive layer device 300, with the exception of the material processing, data analysis, and control schemes described below. The system 500 includes deposition devices 510, a material transfer device 520, and material storage 530. The system 500 also includes a processing circuit 560. The processing circuit 560 includes a central processing unit 562 and a memory chip 564. The memory chip 564 may receive and store a three-dimensional model of the light plate 100 to be constructed, and the processing circuit 560 may control operation of various components of the system 500 (e.g. the deposition devices 510) based on the three-dimensional model. The processing circuit 560 may also control operation of the material storage 530 and the material transfer device 520 in order to transport deposition materials from the material storage 530 to the deposition devices 510 as necessary for depositing material for specific layers. In some embodiments, the material transfer device 520 includes valves, manifolds, and/or racks for distributing materials from the material storage 530 to the deposition devices 510. The processing circuit 560 may control operation of the deposition devices 510 during deposition of material in order to modify the translucency of the light plate 100.

The system 500 includes a laser device 570 used to combine layers of material with one another. The laser device 570 may laser sinter layers of material to one another. The laser device 570 may be similar or identical to the laser device 370 shown in FIG. 6. The laser device 570 may be used to deposit, adhere, sinter, or cross-link layers of material to one another to make the light channels 105 and/or layers translucent and/or conductive according to the translucency map.

Figure 8:
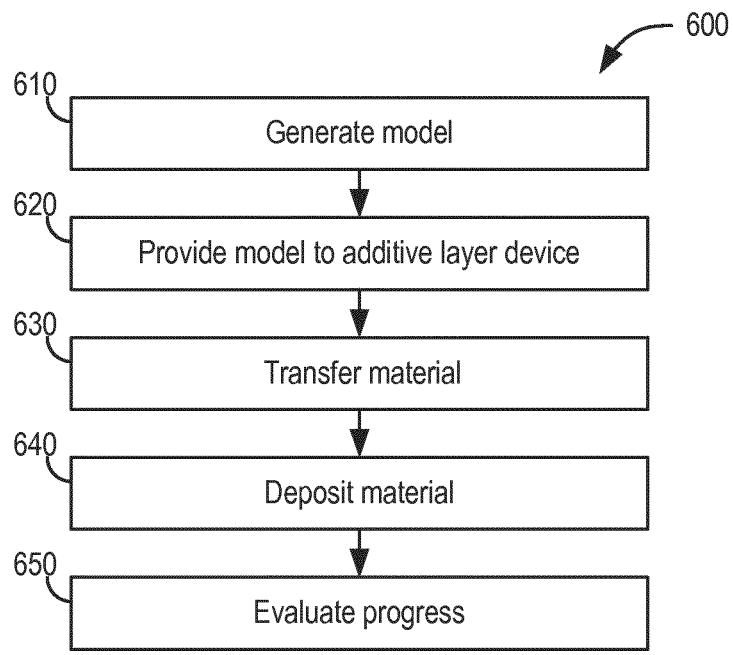
FIG. 8 is a block diagram of a method for manufacturing a light plate according to an exemplary embodiment.

Referring to FIG. 8, a method 600 for manufacturing a light plate (e.g., the light plate 100 shown in FIG. 1) using additive layer deposition is shown. At 610, a three-dimensional model of a light plate is generated. The three-dimensional model may be generated using a computer or other device communicably connected to an additive layer device (e.g., additive layer device 300 shown in FIG. 6). The three-dimensional model may be a fully detailed representation of the light plate. Alternatively, the three-dimensional model may be a partial representation of the light plate, and the additive layer device may be configured to fill in any gaps in the representation of the light plate based on previously established patterns for construction of the light plate. The three-dimensional model may include a translucency map, and the translucency map may include a first portion having a first translucency, a second portion having a second translucency, and one or more light channels to be formed in the light plate.

At 620, the three-dimensional model is provided to the additive layer device. In some embodiments, a user provides the three-dimensional model to the additive layer device. A user may also control or modify the three-dimensional model. The additive layer device may include a user interface for displaying the three-dimensional model and manipulating the three-dimensional model. In some embodiments, the additive layer device may be pre-loaded with three-dimensional models for producing light plates.

At 630, the additive layer device transfers materials and deposits one or more materials such that they may be added to one another.

In some embodiments, a system for transferring material (e.g. rack, manifold 360 as shown in FIG. 6, system with valves) is provided. The additive layer device may control operation of the system for transferring material in order to appropriately provide one or more materials to form a layer. For example, the three-dimensional model of the light plate may specify that a layer of the light plate may be formed from a specific material (e.g., acrylic) or combination of materials (e.g., acrylic and metal, materials with different densities or coarseness), and the additive layer device may transfer the specific material or combination of materials for deposition in the layer.

At 640, the deposited materials are joined with one another to form a layer onto a base material based on the three-dimensional model. The additive layer device may deposit materials in layers based on the three-dimensional model specifying which materials are to be provided in certain layers, or other similar position-based specifications. For example, the layer deposition devices may be configured to provide acrylic for a body of the light plate, followed by or intermixed with metal or plastic for components such as knobs, buttons, switches, and/or nomenclature, (see, e.g., body 160, knobs 110, buttons 120, switches 130, nomenclature 140), followed by paint for visualization layers. In some embodiments, the deposition devices may be configured to provide a layer or several consecutive layers of metal material to form a metal plate, such as a metal plate configured to reduce electromagnetic interference.

In some embodiments, the layers of materials adhere to one another after being deposited by the deposition devices. In other embodiments, a laser device (e.g., laser device 370 shown in FIG. 6) is used to adhere, deposit, sinter, cross-link, solidify, and/or bond the layers of material to one another, such as by applying energy to the layers of material.

In some embodiments, the laser device is used to cross-link layers of material by laser sintering. For example, the laser device may apply a laser to adjoining layers of material in order to for a coherent crystal lattice among the layers of material, thus configuring the layers of material to be relatively translucent. In some embodiments, the laser device applies the laser based on the translucency map. For example, the translucency map may include a first portion having a relatively low translucency in which layers of material are adhered to one another, and a second portion having a relatively high translucency in which layers of material are cross-linked to one another. In some embodiments, a user may provide user input to control operation of the laser device.

Figure 9:
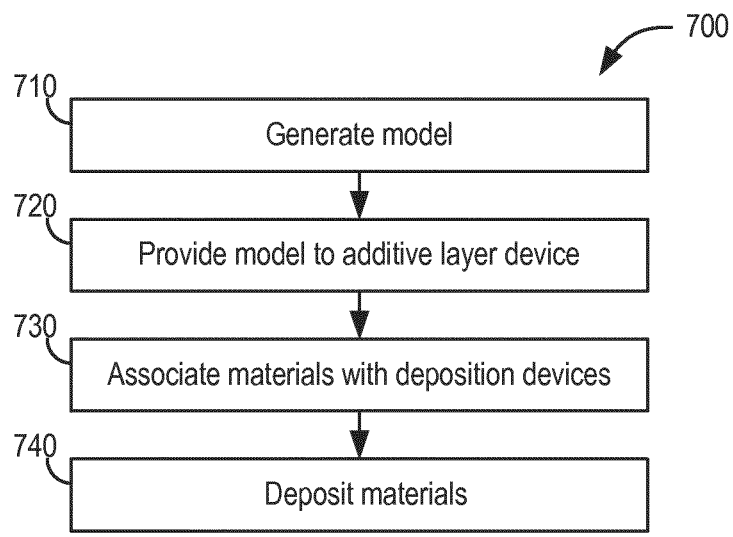
FIG. 9 is a block diagram of a method for manufacturing a light plate according to an exemplary embodiment.

Referring to FIG. 9, a method 700 for manufacturing a light plate (e.g., the light plate 100 shown in FIG. 1) using additive layer deposition is shown. At 710, a three-dimensional model of a light plate is generated. The three-dimensional model may be generated using a computer or other device communicably connected to an additive layer device (e.g., the additive layer device 300 shown in FIG. 6). The three-dimensional model may be a fully detailed representation of a light plate. Alternatively, the three-dimensional model may be a partial representation of a light plate, and the additive layer device may be configured to fill in any gaps in the representation of the light plate based on previously established patterns for construction of the light plate. The three-dimensional model may include a translucency map including a first portion having a first translucency, a second portion having a second translucency, and at least one light channel. The translucency map may guide a determination of which layers are to be adhered to one another, which layers are to be cross-linked (e.g., by laser sintering) to one another, and which layers are to be otherwise deposited.

At 720, the three-dimensional model is provided to the additive layer device. In some embodiments, a user provides the three-dimensional model to the additive layer device. A user may also control or modify the three-dimensional model. The additive layer device may include a user interface for displaying the three-dimensional model and manipulating the three-dimensional model. In some embodiments, the additive layer device is pre-loaded with three-dimensional models for producing light plates.

At 730, a plurality of materials are provided by the additive layer device. In some embodiments, specific materials or combinations of materials are associated with specific deposition devices or layers. For example, the deposition devices may be variously configured to efficiently deposit certain materials (e.g., deposit solid/pelletized or powdered material in individual depositions, deposit liquid/slurry material in a continuous flow). In some embodiments, material is deposited at specific locations relative to the light plate.

At 740, materials are deposited. In some embodiments, a light plate is formed by depositing base layers (e.g., acrylic) to form a body (e.g., body 160 shown in FIG. 1) of the light plate, followed by depositing visual materials (e.g., paints, dyes, fluorescent material) to form visualization layers. The additive layer device may be directed to provide a layer or several consecutive layers of metal material to form a metal plate, such as a metal plate configured to reduce electromagnetic interference.

In some embodiments, the layers materials adhere to one another after being deposited. In other embodiments, a laser device (e.g., laser device 370 shown in FIG. 6) may be used to adhere or solidify the layers of material to one another by applying energy to the layers.

In other embodiments, the laser device is used to cross-link layers of material by laser sintering. For example, the laser device may apply a laser to adjoining layers of material having their material properties configured to form a coherent crystal lattice among the layers of material, thus configuring the layers of material to be relatively translucent. In some embodiments, the laser device applies the laser based on the translucency map. For example, the translucency map may include a first portion having a relatively low translucency in which layers of material are adhered to one another, and a second portion having a relatively high translucency in which layers of material are cross-linked to one another. The laser device may selectively apply a laser only to layers of material in the second portion. In some embodiments, a user may provide user input to control operation of the laser device.

In some embodiments, materials in each layer are deposited simultaneously. For example, the model of the light plate may specify the materials or combinations of materials (e.g., metallic powders and thermoset plastics) to be deposited in a particular layer. The additive layer device may coordinate activity of the deposition devices so that the materials are simultaneously or sequentially deposited based on the three-dimensional model and the relative locations of the layers.

In some embodiments, materials in each layer are deposited in a sequential order. For example, the three-dimensional model of the light plate may be used to specify the materials to be deposited in a particular layer, and may also specify an order in which the materials are to be deposited. Certain materials may be deposited before/after other materials. For example, when forming a layer including a threaded insert, a first material may be deposited to form an opening of the threaded insert, followed by a second material deposited to adhere to the opening to form threading of the threaded insert.

In some embodiments, a user may pause the operation of the additive layer device during a deposition process, to modify the deposition process, or may modify the deposition process in real-time without pausing the operation of the additive layer device. For example, a user may exchange materials from storage tanks 320, exchange or modify the three-dimensional model used to construct the light plate 100, manually apply materials to the light plate; etc.

It is important to note that the construction and arrangement of the elements of the structures, systems, and methods as shown in the exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the embodiments. Accordingly, all such modifications are intended to be included within the scope of the present disclosure as defined in the appended claims. The order or sequence of any process or method steps may be varied or re-sequenced according to alternative embodiments. Other substitutions, modifications, changes and/or omissions may be made in the design, operating conditions, and arrangement of the exemplary embodiments without departing from the broad scope of the present disclosure.

What is claimed is:

1. A method of manufacturing a light plate, comprising:
defining a three-dimensional model of a light plate, the three-dimensional model including a translucency map configured to light-balance the light plate, wherein the translucency map defines a first portion having a first translucency and a second portion having a second translucency greater than the first translucency;
providing the three-dimensional model to an additive layer device;
selecting at least one material based on the three-dimensional model;
depositing the at least one material in at least three layers based on the three-dimensional model, the at least three layers including a first pair of adjacent layers and a second pair of adjacent layers; and
adhering and not cross-linking the first pair of adjacent layers with one another to form a first region of the light plate corresponding to the first portion of the translucency map, and cross-linking the second pair of adjacent layers with one another to at least one of (1) align a respective lattice of each adjacent layer of the second pair of adjacent layers or (2) form a coherent/organized lattice between the adjacent layers of the second pair of adjacent layers to form a second region of the light plate corresponding to the second portion of the translucency map.

2. The method of claim 1, wherein the translucency map comprises a light channel region, and the light plate comprises a light channel configured to pass light through an interior region of the light plate.

3. The method of claim 1, wherein the translucency map is configured to light-balance the light plate such that light passing through a top surface of the light plate is uniform in intensity.

4. The method of claim 1, further comprising depositing a second material configured to receive a push button.

5. The method of claim 1, further comprising depositing a second material to form a threaded insert.

6. The method of claim 1, further comprising depositing a metal material to form a metal insert layer configured to minimize electromagnetic interference.

* * * * *